US008665752B2

(12) United States Patent  (10) Patent No.: US 8,665,752 B2
Davison  (45) Date of Patent: Mar. 4, 2014

(54) NETWORK MODELING, SERVICE PROVISIONING, AND SERVICE MANAGEMENT

(75) Inventor: Eric Davison, Oxfordshire (GB)

(73) Assignee: Ciena Corporation, Hanover, MD (US)

( * ) Notice: Subject to any disclaimer, the term of this patent is extended or adjusted under 35 U.S.C. 154(b) by 180 days.

(21) Appl. No.: 13/176,634

(22) Filed: Jul. 5, 2011

(65) Prior Publication Data

US 2013/0010637 A1  Jan. 10, 2013

(51) Int. Cl.
*G01R 31/08* (2006.01)
(52) U.S. Cl.
USPC ............ 370/254; 370/251; 370/252; 370/235
(58) Field of Classification Search
USPC ......... 370/225, 251–254, 228, 237, 401, 408, 370/235, 392, 389, 217, 219; 709/223–225, 709/253, 254
See application file for complete search history.

(56) References Cited

U.S. PATENT DOCUMENTS

| 6,697,329 | B1* | 2/2004 | McAllister et al. | 370/235 |
|---|---|---|---|---|
| 6,728,205 | B1* | 4/2004 | Finn et al. | 370/217 |
| 7,263,062 | B2* | 8/2007 | Chikazawa et al. | 370/224 |
| 7,366,120 | B2* | 4/2008 | Handforth et al. | 370/310 |
| 7,688,712 | B2* | 3/2010 | Glapin et al. | 370/216 |
| 8,107,360 | B2* | 1/2012 | Patel et al. | 370/217 |
| 8,125,928 | B2* | 2/2012 | Mehta et al. | 370/254 |
| 8,289,878 | B1* | 10/2012 | Gonzalez et al. | 370/254 |
| 2003/0103455 | A1* | 6/2003 | Pinto | 370/230 |
| 2004/0085894 | A1* | 5/2004 | Wang et al. | 370/216 |
| 2004/0165525 | A1* | 8/2004 | Burak | 370/228 |
| 2007/0280102 | A1* | 12/2007 | Vasseur et al. | 370/225 |
| 2008/0123651 | A1* | 5/2008 | Vasseur et al. | 370/392 |
| 2012/0147740 | A1* | 6/2012 | Nakash | 370/221 |

* cited by examiner

*Primary Examiner* — Dang T Ton
*Assistant Examiner* — Sai Aung
(74) *Attorney, Agent, or Firm* — Clements Bernard PLLC; Christopher L. Bernard; Lawrence A. Baratta, Jr.

(57) ABSTRACT

Methods and devices for network modeling, service provisioning, and service management are disclosed. A network modeling method includes accessing information describing a set of nodes of a communications network, physical links physically connecting the nodes, and logical links logically connecting the nodes using the physical links. The method further includes, based on the information, creating a different connection group object for each of the physical links and for each of the logical links. Each connection group object includes a connection representing the link, a first endpoint representing a first node of the set connected to the link; and a second endpoint representing a second node of the set connected to the link.

20 Claims, 7 Drawing Sheets

NETWORK MODELING, SERVICE PROVISIONING, AND SERVICE MANAGEMENT

TECHNICAL FIELD

The present invention, in various embodiments, relates to network modeling, service provisioning, and service management.

BACKGROUND OF THE INVENTION

Provisioning services over a communications network typically involves communicating with nodes of the network to change operating parameters used by the nodes. Some network operators have developed a semi-automated method for changing such parameters using provisioning templates designed to change the parameters on a particular type (e.g., model) of network node. Typically, the network operator manually creates a different provisioning template for each different type of network node. Once a provisioning template is created, it may be reused, in some cases, on many different nodes to provision services having the same attributes (e.g., bandwidth, quality, etc.) as long as the nodes are all the same type. This method of provisioning parameters of nodes is effective, but not flexible.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
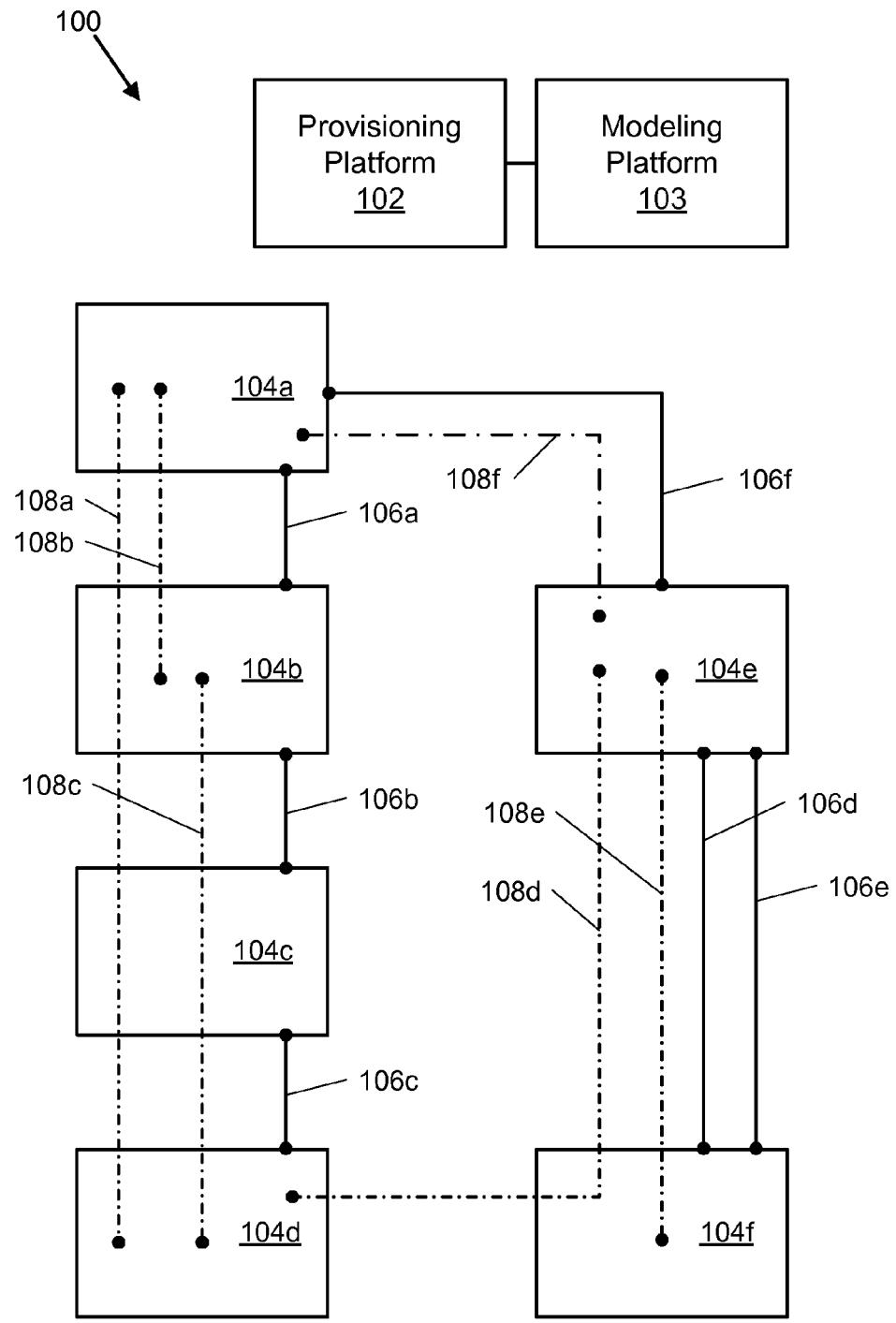
FIG. 1 is a block diagram of a communications network according to one embodiment.

Methods, systems, and devices for network modeling, service provisioning, and service management are described herein. First, a network modeling method is described in which links of a communications network are represented as connection group objects. Next, a service provisioning method using the connection group objects is described. Finally, methods of managing services established by the service provisioning method are described.

According to one aspect of the invention, a network modeling method includes accessing information describing a set of nodes of a communications network, physical links physically connecting the nodes, and logical links logically connecting the nodes using the physical links. In one embodiment, the network may be a data packet network and the nodes may be packet switches.

The method further includes, based on the information, creating a different connection group object for each of the physical links and for each of the logical links. Each connection group object includes a connection representing the link, a first endpoint representing a first node of the set connected to the link, and a second endpoint representing a second node of the set connected to the link.

At least one of the logical links may be a redundant logical link joining two of the nodes. In one embodiment, the redundant logical link may include one primary path and only one redundant path. In another embodiment, the redundant logical link may include three or more redundant paths joining the two nodes and the three or more redundant paths may belong to the same virtual local area network, spanning tree, virtual circuit, connectivity fault management (CFM) maintenance association, virtual switch, a VPLS service instance, or tunnel group.

At least one of the logical links may connect two of the nodes, and a shortest physical path between the two nodes may utilize two or more of the physical links. One of the logical links may be supported by two or more of the physical links and the connection group object representing the one logical link may include fields identifying the connection group objects of the two or more physical links supporting the one logical link. In one embodiment, each connection group object may represent a different single one of the links.

The method may further include preventing a connection group object representing one of the nodes but not one of the links from being created. Each link may be represented by only one of the connections. However, at least some of the nodes may be represented by more than one of the points.

Each connection group object may further include one or more attributes describing a characteristic of communication facilitated by the connection of the connection group object. The one or more attributes may include one or more attributes selected from among a committed information rate, a committed burst size, an excess information rate, an excess burst size, booked bandwidth, latency, jitter, and maximum bandwidth. In some implementations, the method may further include determining resource consumption of all or part of the network by examining the attributes of one or more of the connections of the connection group objects.

Prior to further describing the network modeling methods outlined above, an example communications network having links and nodes will first be described.

Referring to FIG. 1, a communications network 100 is illustrated. Network 100 includes nodes 104 connected by logical links 108 and physical links 106. Logical links 108 and physical links 106 may enable communication between nodes 104. Such communication may be communication in the form of data packets and/or signals. The communication may be electronic or in some cases optical. In one embodiment, communications network 100 may be a data packet network in which case notes 104 may be data packet switches that switch data packets such as Ethernet and/or Internet Protocol data packets.

Physical links 106 physically connect nodes 104 in a wired or wireless fashion and provide communications channels between nodes 104. Typically, each end of a physical link 106 is connected to a port of a node 104. For example, FIG. 1 illustrates a port of node 104a connected to a port of node 104b by physical link 106a. In some cases, a pair of nodes 104 may be joined by more than one physical link 106. Physical links 106 may use a particular communications protocol or standard (e.g., Ethernet, IP, etc.). As illustrated in FIG. 1, each physical link 106 connects two of nodes 104 without traversing any other node of network 100.

Logical links 108 provide logical connectivity between endpoints located on nodes 104. For example, logical link 108a provides logical connectivity between node 104a and node 104d. Logical links 108 may utilize a particular scheme (e.g., protocol, standard, etc.) in facilitating communication between nodes 104.

Note that although a logical link 108 may have two endpoints located on two nodes 104, it may traverse other nodes 104. For example, logical link 108a has a first endpoint on node 104a and a second endpoint on node 104d. Furthermore, logical link 108a traverses nodes 104b and 104c, although it does not have endpoints on these nodes. Nodes 104b and 104c facilitate logical link 108a but do not serve as endpoints for logical link 108a. Consequently, information sent by node 104d on logical link 108a may pass through nodes 104c and 104b on its way to node 104a and logical link 108a may be configured to prevent the information from being forwarded to any node other than node 104a.

Examples of logical links 108 include conductivity fault management (CFM) associations (IEEE 802.1ag), provider backbone bridging tunnels (IEEE 802.1ah), provider backbone bridging traffic engineering (PBB-TE) tunnels (Ethernet switched paths defined by IEEE 802.1Qay), PBB-TE services (Instance-service identifier associations), multi protocol label switching (MPLS) virtual circuit associations, MPLS label switched paths, virtual switches (Ethernet forwarding domains), optical channel data unit (ODU) channels, virtual local area networks (VLANs), transport VLANs, link aggregations, spanning tree domains, optical signal and routing protocol (OSRP™) mesh networks, as well as Ethernet-Line services such as Ethernet private line (EPL) and Ethernet virtual private line (EVPL), Ethernet LAN services, Ethernet tree (E-Tree) services, and Ethernet virtual connections (EVCs).

One logical link 108 may be enabled by other logical links 108 and/or physical links 106. For example, logical link 108e may be an Ethernet link aggregation group and physical links 106d and 106e may belong to the link aggregation group represented by logical link 108e. In this case, logical link 108e is not able to communicate without the use of physical links 106d and 106e. Thus, physical links 106d and 106e support logical link 108e. In another example, a logical link representing an Ethernet Private Line service may rely on a logical link representing a virtual switch, a logical link representing a transport VLAN, a logical link representing a link aggregation group and physical links representing the links belonging to the link aggregation group.

Logical links 108 and/or physical links 106 may provide redundant paths between nodes 104. For example, logical link 108e may redundantly connect nodes 104e and 104f with two paths, one using physical link 106d and one using physical link 106e.

Similarly, logical link 108a may redundantly connect nodes 104a and 104d with two paths. The first path may include logical paths 108b (enabled by physical path 106a) and 108c (enabled by physical paths 106b and 106c). The second path may include logical paths 108d (enabled by physical paths 106d and 106e) and 108f (enabled by physical path 106f). In some cases, one path may be designated as a primary path and the other path may be designated as a redundant path used in case the primary path fails or degrades. Other examples are possible, in which a redundant logical link has more than two redundant paths.

Logical links 108 and physical links 106 may have resources and attributes. For example, resources of a physical link 106 may include its bandwidth and attributes of physical link 106 may include its cost, location, latency, jitter, rate, and so on. Resources of a logical link 108 may include its bandwidth and available identifiers (e.g., VLAN tags, MPLS labels, etc.). Attributes of a logical link 108 may include committed information rate, excess information rate, and so on.

Network 100 may be modeled using connection group objects representing the links of the network and the way that the links are connected to the nodes of the network.

Figure 2A:
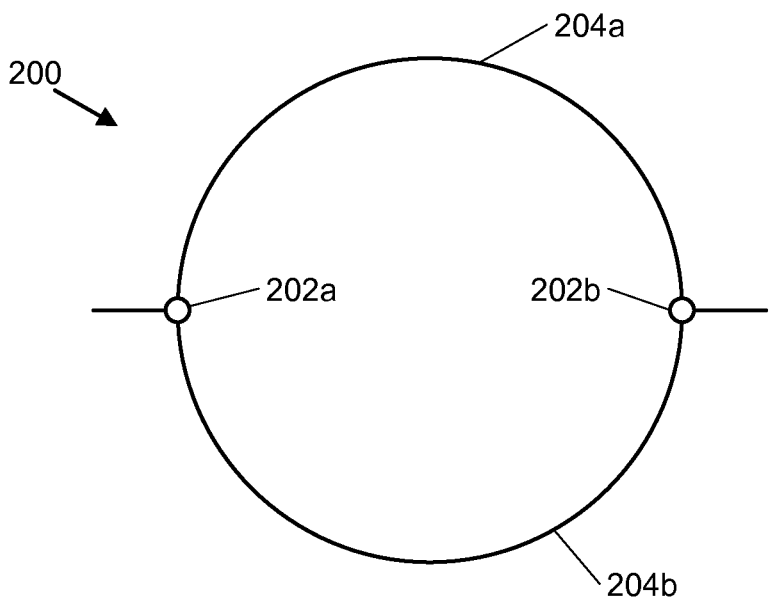
FIG. 2A illustrates a connection group object according to one embodiment.

Referring to FIG. 2A, a connection group object 200 is illustrated. Connection group object 200 represents a redundant link (either a logical link 108 or a physical link 106) between two nodes 104 having two redundant paths. One node is represented by endpoint 202a and the other node is represented by endpoint 202b. One path of the redundant link is represented by connection 204a and the other path of the redundant link is represented by connection 204b. In one example, connection group object 200 may be used to represent logical link 108e of FIG. 1, which is a link aggregation group comprising physical links 106d and 106e and is therefore a redundant logical link.

Figure 2B:
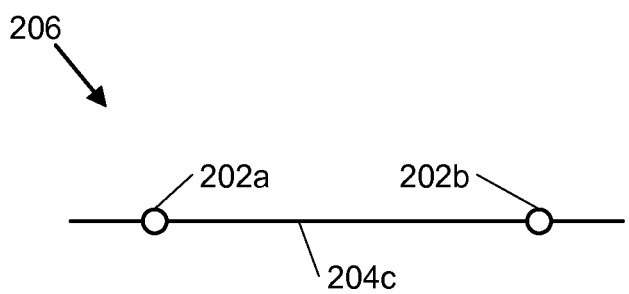
FIG. 2B illustrates another connection group object according to one embodiment.

Referring to FIG. 2B, another connection group object 206 is illustrated. Connection group object 206 represents a non-redundant link (either a logical link 108 or a physical link 106) between two nodes 104. As with connection group object 200, one node is represented by endpoint 202a the other node is represented by endpoint 202b. The non-redundant link is represented by connection 204c. In one example, connection group object 206 may be used to represent any of the physical links 106 of FIG. 1.

Figure 2C:
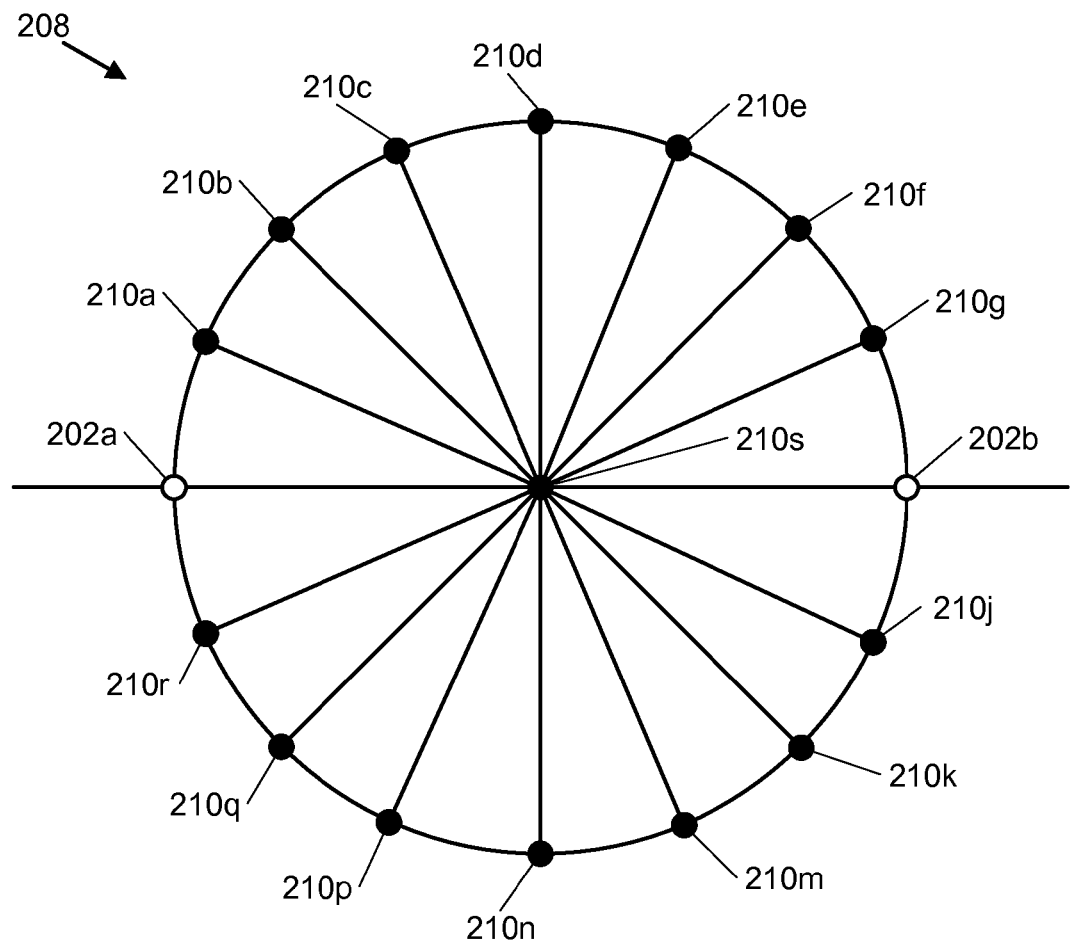
FIG. 2C illustrates another connection group object according to one embodiment.

Referring to FIG. 2C, another connection group object 208 is illustrated. Connection group object 208 represents a redundant link with more than two redundant paths. The nodes connected by the link represented by connection group object 208 are represented by endpoints 202a and 202b. Connection group object 208 also includes intermediate points 210, which facilitate connectivity between endpoints 202a and 202b. Intermediate points 210 provide many different paths between endpoints 202a and 202b. One such path may traverse intermediate points 210a and 210s. Another such path may traverse intermediate points 210a, 210b, 210c, 210d, 210e, 210f, and 210g. Other paths between endpoints 202a and 202b are also possible.

Connection group object 208 may be especially effective at representing logical links having multiple intermediate points with multiple paths between endpoints such as spanning tree domains, VLANs, CFM maintenance associations, virtual switches, and tunnel groups.

Although FIG. 2C illustrates connection group object 208 as having fifteen intermediate points 210, other embodiments are possible in which connection group object 208 has more or fewer than 15 intermediate points.

As was mentioned above, connection group objects 200, 206, and 208 each represent one link and the two nodes joined by the link. Accordingly, one method of modeling network 100 may include creating a connection group object for each link of network 100 based on characteristics of the link. Using this method, each node of network 100 will be referenced by at least one of the connection group objects since each node of network 100 is connected to at least one link. In one embodiment, connection object groups 200, 206, and 208 each have represent only two endpoints and one link.

Returning now to FIG. 1, modeling platform 103 may access information describing nodes 104, physical links 106, and logical links 108, and how the nodes and links are interconnected. Based on the information, modeling platform 103 may create a different connection object groups for each link of network 100.

In one embodiment, modeling platform 103 may access the information by communicating with nodes 104 directly. Alternatively, modeling platform 103 may retrieve the information from another device such as a network discovery module (not illustrated). In yet another embodiment, modeling platform 103 may receive the information from a network operator.

In one embodiment, modeling platform 103 may create connection group objects only for links, not for nodes and may even prevent connection group objects from representing a node but not a link. In other words, a different connection group object may be created for each link and each connection group object may reference two or more of the nodes, but a connection group object is not created for a node itself. Doing so may reduce the number of objects needed to model network 100 as compared to a modeling method in which a link is represented by two different objects, one representing each node to which the link is connected. In large networks, this difference may be substantial since representing a link with a single object may consume far less computer storage space than representing a link with two different objects. Furthermore, operations using the objects may be substantially faster when a link is represented by a single object.

Furthermore, modeling platform 103 may ensure that each link of network 100 is represented by only one connection group object and therefore only one connection. One result of representing each link with a different connection group object is that many different connection group objects may reference a single node since that single node may be an endpoint for many different links. For example, as illustrated in FIG. 1, node 104 is an endpoint for physical links 106a and 106b and logical links 108b and 108c.

In one embodiment, modeling platform 103 may represent every link of network 100 using only connection group objects 200, 206, and 208. In this manner, modeling platform 103 performs a supersetting and normalizing function whereby all links of network 100 can be simplified as a connection group object having only two endpoints. Decomposing into one of these three very simple connection group objects (i.e., normalizing) may provide several advantages. First, the simplicity of the connection group objects may make storage of the objects more efficient and operations on the objects more rapid than if many different object types were used. Second, as will be described further below, using the three simple connection group objects (which form a superset) and enables the use of recursive algorithms when provisioning services on the network represented by the connection group objects.

Once a network has been modeled using connection group objects 200, 206, and 208 as described above, services may be provisioned in the network using the connection group objects.

According to another aspect of the invention, a service provisioning method includes accessing a plurality of connection group objects representing physical links and logical links that connect a set of nodes of a communications network, each connection group object comprising two endpoints representing two nodes of the set joined by the link represented by the connection group object. The method further includes creating a service object representing a communications service between a first node of the network and a second node of the network.

The method further includes determining a first set of one or more of the connection group objects that together provide logical connectivity between the first node and the second node and identifying the first set of the connection group objects as supporting services of the service object. The method further includes determining a second set of one or more of the connection group objects that together provide connectivity between the endpoints of the first set of connection group objects and identifying the second set of the connection group objects as supporting services of the first set of connection group objects. The method further includes allocating resources of the links represented by the first and second sets of connection group objects to the communications service.

The method may further include identifying a third set of one or more of the connection group objects that together provide connectivity between the endpoints of the second set of connection group objects and marking the third set of the connection group objects as supporting services of the second set of connection group objects. The allocating of the resources may include recursively allocating resources of the supporting services of the service object to the communications service then allocating the supporting services of the supporting services of the services object to the communications service then allocating the supporting services of the supporting services of the supporting services of the communications service to the communications service.

The second set of the connection group objects may together provide logical connectivity between the endpoints of the first set of the connection group objects. Alternatively, the second set of the connection group objects may together provide physical connectivity between the endpoints of the first set of the connection group objects.

The link of a first one of the connection group objects of the first set may connect the first node to an intermediate node and the link of another of the connection group objects of the first set connects the intermediate node to the second node.

At least one of the logical links may connect two of the nodes by traversing one or more of the other nodes of the network. However, each physical link may connect two of the nodes without traversing any other of the nodes.

The resources may include capacity of the links and may include identifiers used to encapsulate data packets carried by the links. The determining of the first set may include selecting the first set based on one or more criteria related to attributes of the links and the resources of the links.

Returning to FIG. 1, provisioning platform 102 may provision services within network 100 using connection group objects representing the links of network 100. As was discussed above, modeling platform 103 may create the connection group objects and may make the connection group objects accessible to provisioning platform 102.

Figure 3A:
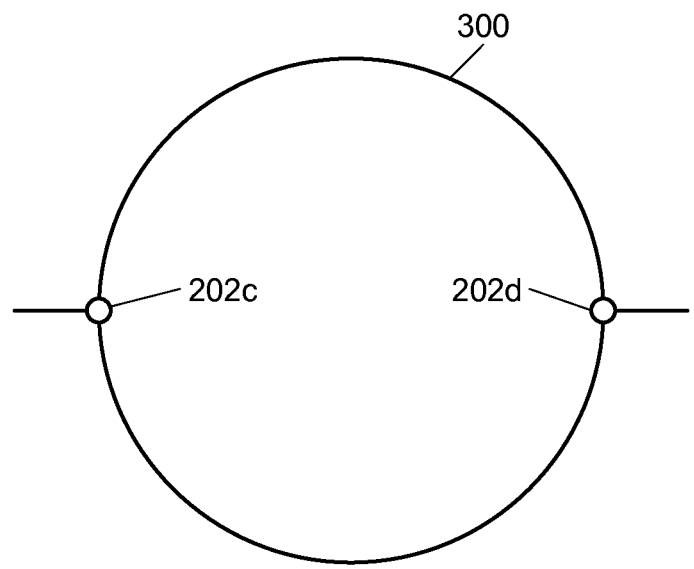
FIG. 3A illustrates a service object according to one embodiment.

Referring to FIG. 3A, provisioning platform 102 may first create a service object 300 representing a service between two endpoints 202c and 202d. As illustrated in FIG. 3A, service object 300 may be of the same type as connection group object 200 described above in relation to FIG. 2A. Service object 300 may represent, for example, a point-to-point Ethernet service that preserves VLAN tags of data packets carried by the service from endpoint 202c to endpoint 202d.

Provisioning platform 102 may search through the objects created by modeling platform 103 to find a logical link having endpoints on the same nodes as endpoints 202c and 202d. In doing so, provisioning platform 102 may look for a connection group object representing a redundant logical link that preserves VLAN tags of data packets that it carries. In doing so, provisioning platform 102 may inspect attributes of connection group objects to determine whether a particular connection group object represents a redundant or non-redundant logical link.

Figure 3B:
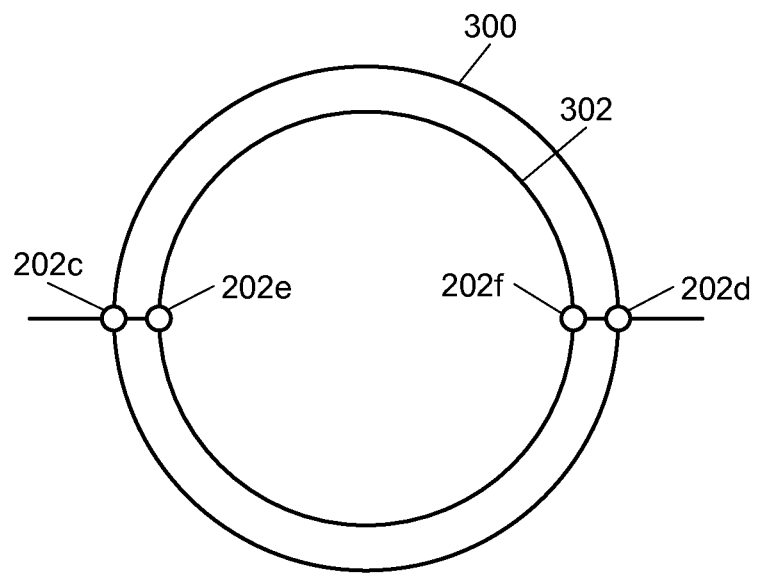
FIG. 3B illustrates a service object and a supporting service according to one embodiment.

Referring to FIG. 3B, provisioning platform 102 may identify object 302 as having endpoint 202e on the same node as endpoint 202c and having endpoint 202f on the same node as endpoint 202d and representing a logical link that is a pair of IEEE 802.1Qay PBB-TE tunnels. After identifying objects 302, provisioning platform 102 may associate object 302 with object 300. Furthermore, object 302 may be referred to as a supporting service of object 300 since object 302 enables object 300.

Next, provisioning platform 102 may search through the objects created by modeling platform 103 to find a logical link that can support object 302. In doing so, provisioning platform 102 may look for objects having endpoints on the same nodes as endpoints 202e and 202f.

Figure 3C:
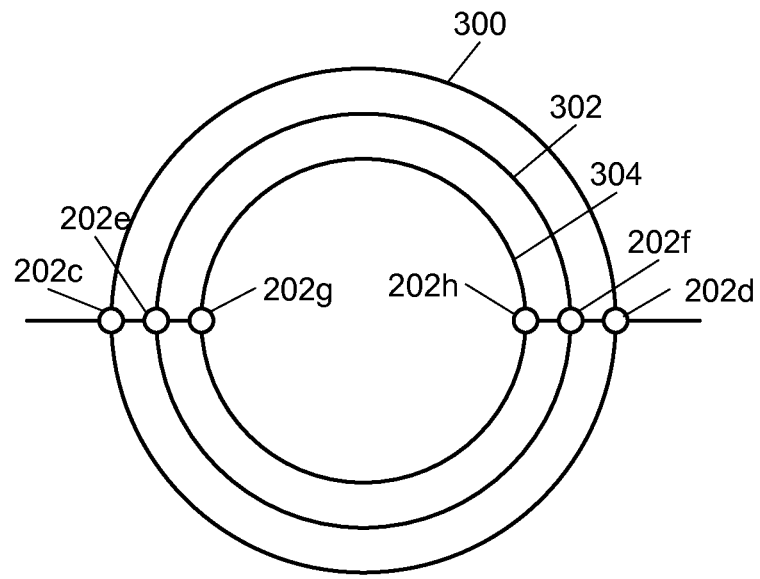
FIG. 3C illustrates a service object and two supporting services according to one embodiment according to one embodiment.

Referring to FIG. 3C, provisioning platform 102 may identify object 304 as having endpoint 202g on the same node as endpoint 202e and having endpoint 202h on the same node as endpoint 202f and representing a logical link that is an ODU channel. Provisioning platform 102 then associates object 304 with object 302. Object 304 may be referred to as a supporting service of object 302 since object 304 enables object 302.

Next, provisioning platform 102 may search through the objects created by modeling platform 103 to find a physical link that can support object 304. In doing so, provisioning platform 102 may look for objects having endpoints on the same nodes as endpoints 202g and 202h.

Figure 3D:
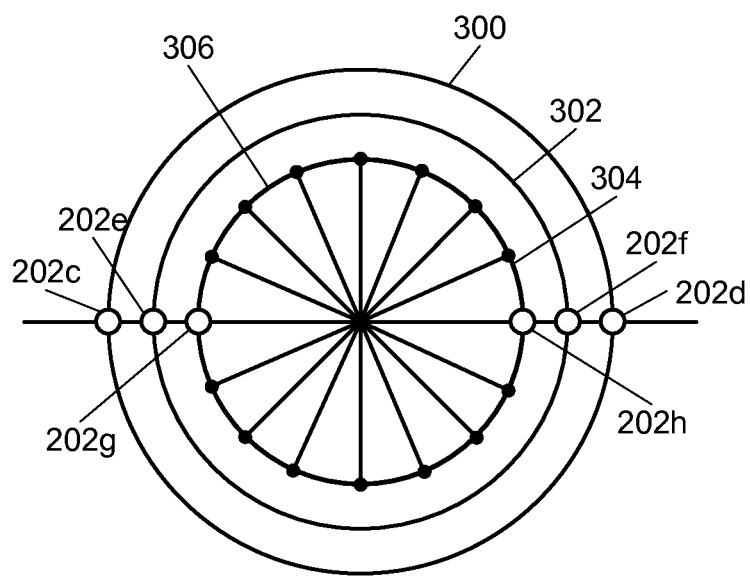
FIG. 3D illustrates a service object and three supporting services according to one embodiment according to one embodiment.

Referring to FIG. 3D, provisioning platform 102 may identify object 306 as having the same endpoints as object 304 and representing a physical link that is an optical mesh topology configured and maintained by OSRP. Provisioning platform 102 then associates object 306 with object 304. Object 306 may be referred to as a supporting service of object 304 since object 306 enables object 304.

Once provisioning platform 102 is associated objects 302, 304, and 306 with service object 300, provisioning platform 102 may provision the service. In doing so, provisioning platform 102 may perform the following recursive algorithm. First, provisioning platform 102 may determine the supporting service (object 302) of service object 300 and may allocate resources of the supporting service (object 302) to service 300. Next, provisioning platform 102 may determine the supporting service (object 304) of object 302 and may allocate resources of the supporting service (object 304) to service 300. Next, provisioning platform 102 may determine the supporting service (object 306) of object 304 and may allocate resources of the supporting service (object 306) to service 300.

The resources allocated to service 300 may vary depending on the object. For example, for object 302 provisioning platform 102 may allocate one or more instance service identifiers used by the PBB-TE tunnels to service 300 and may allocate a desired amount of bandwidth to service 300. For objects 304, provisioning platform 102 may allocate one or more ODU channel numbers.

In selecting objects 302, 304, and 306, provisioning platform 102 may use one or more criteria related to attributes or resources of objects 302, 304, 306. For example, one criterion that provisioning platform 102 may enforce is that service 300 must be carried by a PBB-TE tunnel. Accordingly, when searching through connection group objects created by modeling platform 103, provisioning platform 102 may eliminate objects that do not represent logical links that are PBB-TE tunnels. In this way, the criteria used by provisioning platform 102 to select objects may be technology-based. In other examples, provisioning platform 102 may select objects that meet a particular cost criteria or physical attribute. For example, provisioning platform 102 may require that redundant paths be physically located in different ducts so that they are less vulnerable to simultaneous outages. To do so, provisioning platform 102 may look at attributes of connection group objects. In another example, provisioning platform 102 may select objects having adequate unallocated bandwidth to support service 300.

In the example described above, the endpoints of the links supporting service 300 were on the same nodes as the endpoints of service 300. In other examples however, some of the endpoints of the links supporting service 300 may be on intermediate nodes and some of the endpoints of the links supporting service 300 may be on the same nodes as the endpoints of service 300.

Figure 4:
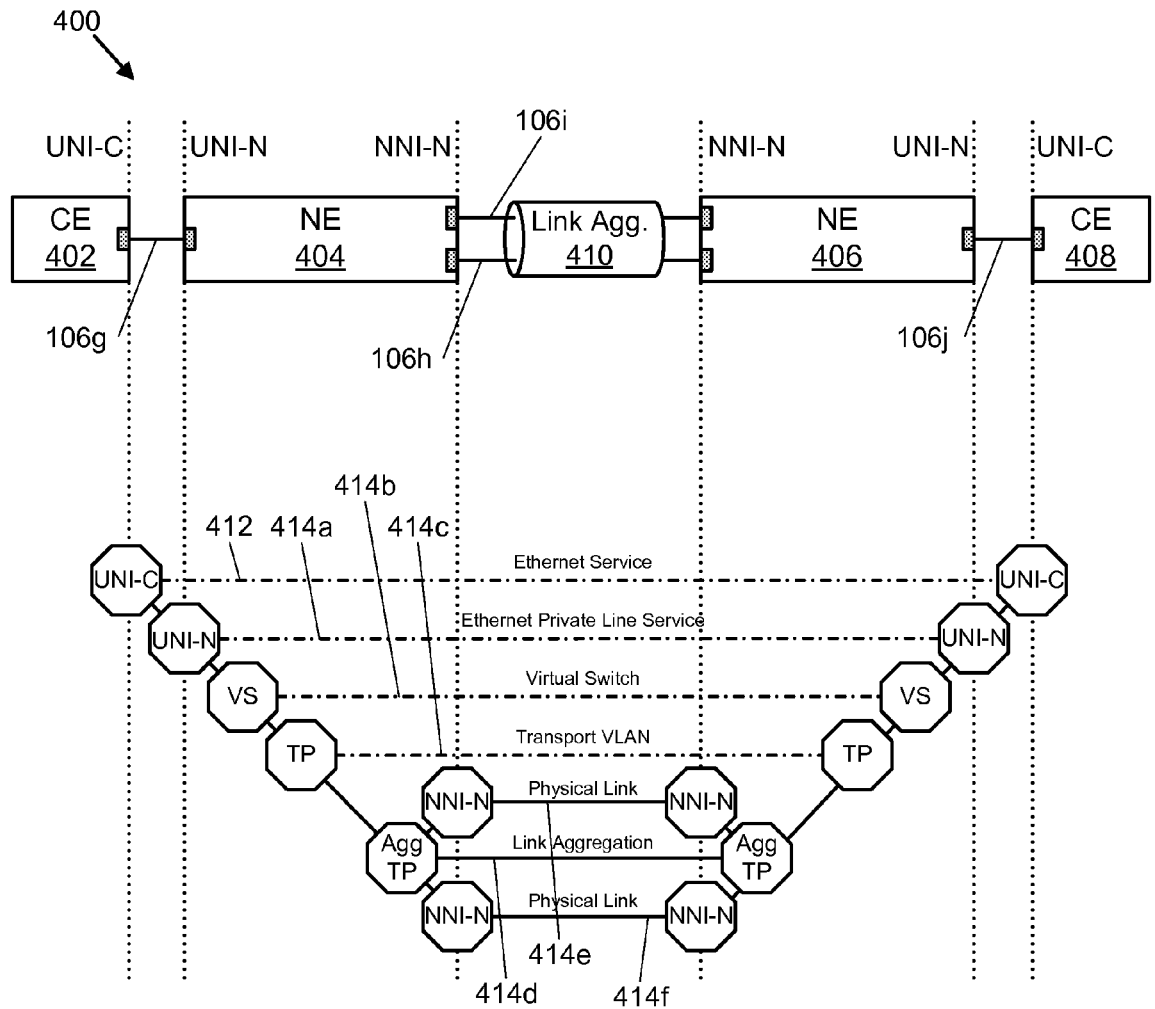
FIG. 4 includes a block diagram of a communications network and illustrates connection group objects associated with a service provided over the communications network according to one embodiment.

Referring to FIG. 4, another example of a communications network 400 is illustrated. Network 400 includes customer equipment nodes 402 and 408 operated by a customer of a service and network equipment nodes 404 and 406 operated by a service provider. These nodes are connected by physical links 106. Physical ports 106h and 106i make up a link aggregation group 410, which is also a logical link.

In addition, User to Network Interfaces (UNI) and Network-to-Network Interfaces (NNI) are illustrated. In particular, a customer UNI (UNI-C) and network UNI (UNI-N), as well as a network NNI are illustrated.

Below network 400 is a connection group object representation of a service provided over network 400. An Ethernet service extending from node 402 to node 408 is represented by service object 412. As was described above, provisioning platform 102 may identify supporting services for a service object. As illustrated in FIG. 4, provisioning platform 102 has identified supporting services 414 for service object 412. These supporting services include Ethernet Private Line object 414a (a logical link) as a supporting service for service object 412, virtual switch object 414b (a logical link) as a supporting service for object 414a, transport VLAN service object 414c (a logical link) as a supporting service for object 414b, link aggregation object 414d (a logical link) as a supporting service for object 414c, and physical links 414e and 414f as supporting services for object 414d. Each of these supporting service objects 414 have endpoints on nodes 404 and 406.

Once provisioning platform 102 has associated the service object 412 with its supporting services 414, it can provision the Ethernet service by allocating resources from each of objects 414 to service object 412. Once allocated, provisioning platform 102 may communicate with and configure nodes 404 and 406 so that nodes 404 and 406 implement the supporting services represented by objects 414. For example, provisioning platform 102 may configures nodes 404 and 406 to use a particular transport VLAN number (e.g., 223) and may configure nodes 404 and 406 to rate limit traffic associated with the transport VLAN number to a maximum bandwidth value.

As was described above, provisioning platform 102 may allocate resources of a first supporting service to the service, then allocate resources of a second supporting service that supports the first supporting service to the service, then allocate resources of a third supporting service that supports the second supporting service to the service and so on in a recursive manner until resources of all of the supporting services associated with the service have been allocated to the service.

The positions of the endpoints of objects 412 and 414 are purposely positioned with respect to the UNI-C, UNI-N, and NNI-N demarcation lines to show where the endpoints reside functionally. For example, the endpoints of object 414a are aligned with ports of nodes 404 and 406 to indicate that these endpoints are associated with the ports. The endpoints of object 414b are aligned with nodes 404 and 406 generally, rather than being associated with a particular port since object 414b represents a virtual switch logical link.

Once the resources of objects 414 have been allocated to service object 412, communication may be established between nodes 402 and 408. In particular, Ethernet packets may be forwarded from node 402 to node 408. In one embodiment, packets sent into node 404 by node 402 may be identical to packets received by node 408 from node 406 because any modifications to the packets done by node 404 may be undone by node 406 prior to forwarding the packets to node 408.

According to another aspect of the invention, a service management method includes establishing a communications service between an originating node of a communications network and a terminating node of the network by associating one or more first objects with the service, the one or more first objects representing logical links joining nodes of the network; associating one or more second objects with the first objects, the second objects representing physical links joining endpoints of the logical links; and allocating resources of the first objects and the second objects to the service.

The method also includes, responsive to a request to terminate the service, deallocating at least some of the resources without disrupting the association between the service and the first and second objects. The method may further include, responsive to a request to reinstate the service, allocating resources of the first objects and the second objects to the service.

The deallocating may include deallocating without disrupting the association between the first objects and the second objects.

Figure 5:
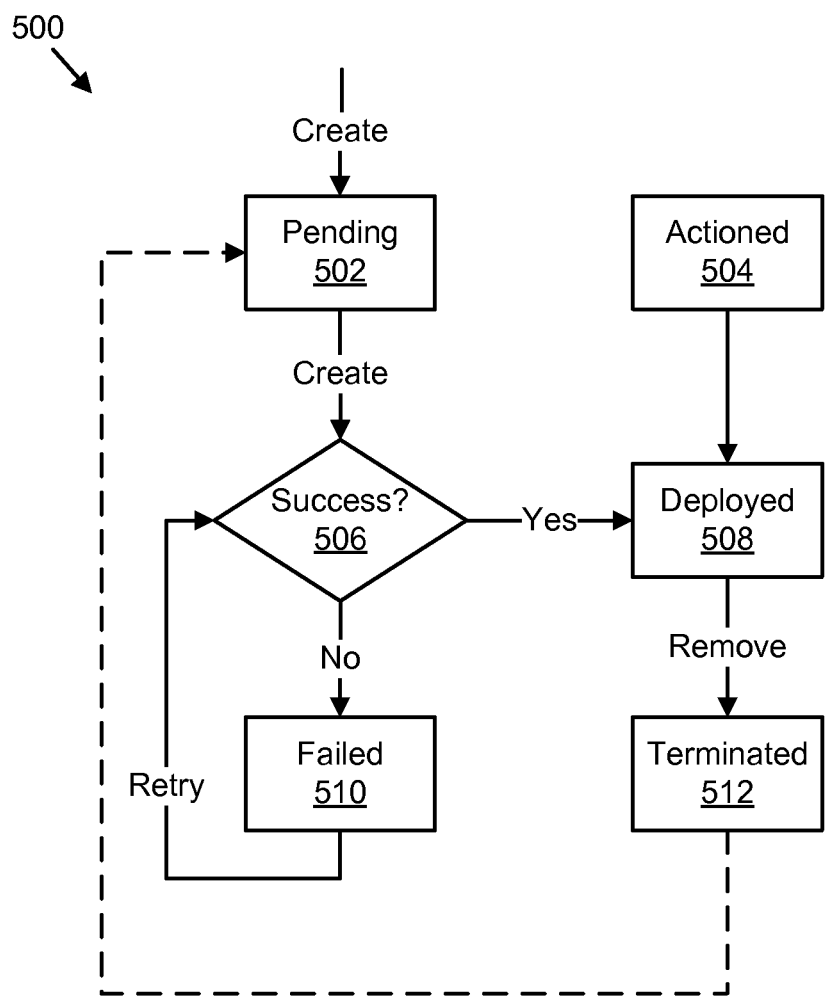
FIG. 5 is a flowchart of a service provisioning method according to one embodiment.

Referring to FIG. 5, a flow chart 500 for a method is illustrated. The method may be performed by provisioning platform 102. At 502, provisioning platform 102 may create a service object and determine supporting service object for the service object. Provisioning platform 102 may further determine that each supporting service object has available the necessary resources to support the service object. At 506, provisioning platform 102 may attempt to communicate with the nodes of a network to make configuration changes that allocate resources to the service object. If the configuration changes are successful, the service object is considered to be deployed 508.

If the configuration changes are not successful, the service object is considered to be failed 510 and provisioning platform 102 tries again to make the configuration changes. Once a service object is in the deployed state, an operator may direct provisioning platform 102 to terminate 512 the service object. In doing so, provisioning platform 102 may communicate with the nodes of the network to make configuration changes that deallocate at least some of the resources previously allocated to the service object. For example, provisioning platform 102 may deallocate a VLAN identifier previously allocated to the service object so that the service is no longer operable.

However, as part of terminating the service object, provisioning platform 102 may leave the associations between the service object and its supporting service objects in place so that if the service object is reactivated, the supporting services will still be in place and the service can be reinstated by reallocating the previously deallocated resources to the service object.

Keeping the supporting services associated with the service object may advantageously decrease an amount of time used to reinstate a previously active service and may help to ensure that characteristics (e.g., latency, bandwidth, tunnels used, etc.) of the reinstated service are similar or identical to characteristics of the previously active service.

According to another aspect of the invention, an article of manufacture includes media including programming configured to cause processing circuitry (e.g., a microprocessor) to perform processing that executes one or more of the methods described above. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette or a ZIP® disk manufactured by the Iomega Corporation of San Diego, Calif.), hard drive, random access memory, read only memory, flash memory, cache memory, and/or other configurations capable of storing programming, data, or other digital information.

Furthermore, provisioning platform 102 and modeling platform 103 may be implemented as software instructions executed by a computer that may be in communication with nodes of a network.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A network modeling method comprising:
   at a modeling platform, accessing information describing a set of nodes of a communications network, physical links physically connecting the nodes, and logical links logically connecting the nodes using the physical links;
   at the modeling platform, based on the information, creating a connection group object for each of the physical links and for each of the logical links, each connection group object comprising:
      a connection representing the link;
      a first endpoint representing a first node of the set connected to the link; and
      a second endpoint representing a second node of the set connected to the link; and
   at a provisioning platform, searching through the connection group objects created by the modeling platform to find supporting logical and physical links and using at least one connection group object to configure an operating behavior of at least one of the nodes of the network;

wherein the modeling platform supersets and normalizes the links in creating the connection group objects such that the subsequent use of a recursive algorithm by the provisioning platform is enabled.

2. The method of claim 1 wherein at least one of the logical links is a redundant logical link joining two of the nodes.

3. The method of claim 2 wherein the redundant logical link has one primary path and only one redundant path.

4. The method of claim 2 wherein the redundant logical link comprises three or more redundant paths joining the two nodes.

5. The method of claim 1 wherein one of the logical links is supported by two or more of the physical links and the connection group object representing the one logical link comprises fields identifying the connection group objects of the two or more physical links supporting the one logical link.

6. The method of claim 1 wherein each connection group object represents a different single one of the links.

7. The method of claim 1 wherein each connection group object further comprises one or more resource fields describing resources of the connection of the connection group object and attributes of communication facilitated by the connection.

8. The method of claim 7 further comprising determining resource consumption of all or part of the network by examining the one or more resource fields of one or more of the connections of the connection group objects.

9. A service provisioning method comprising:
    at a modeling platform, creating a plurality of connection group objects representing physical links and logical links that connect a set of nodes of a communications network, each connection group object comprising two endpoints representing two nodes of the set joined by the link represented by the connection group object;
    at a distinct provisioning platform, using the plurality of connection group objects created by the modeling platform, creating a service object representing a communications service between a first node of the network and a second node of the network;
    at the provisioning platform, determining a first set of one or more of the connection group objects that together provide logical connectivity between the first node and the second node and identifying the first set of the connection group objects as supporting services of the service object;
    at the provisioning platform, determining a second set of one or more of the connection group objects that together provide connectivity between the endpoints of the first set of connection group objects and identifying the second set of the connection group objects as supporting services of the first set of connection group objects; and
    at the provisioning platform, allocating resources of the links represented by the first and second sets of connection group objects to the communications service;
    wherein the modeling platform supersets and normalizes the links in creating the connection group objects such that the subsequent use of a recursive algorithm by the provisioning platform is enabled.

10. The method of claim 9 wherein the determining of the first set comprises selecting the first set based on one or more criteria related to attributes of the links and the resources of the links.

11. The method of claim 9 wherein the allocating of the resources comprises recursively allocating resources of the supporting services of the service object to the communications service then allocating the supporting services of the services object to the communications service then allocating the supporting services of the communications service to the communications service.

12. The method of claim 9 wherein the second set of the connection group objects together provide logical connectivity between the endpoints of the first set of the connection group objects.

13. The method of claim 9 wherein the second set of the connection group objects together provide physical connectivity between the endpoints of the first set of the connection group objects.

14. The method of claim 9 wherein the link of a first one of the connection group objects of the first set connects the first node to an intermediate node and the link of another of the connection group objects of the first set connects the intermediate node to the second node.

15. The method of claim 9 wherein at least one of the logical links connects two of the nodes by traversing one or more of the other nodes of the network.

16. The method of claim 9 wherein each physical link connects two of the nodes without traversing any other of the nodes.

17. The method of claim 9 wherein the resources comprise identifiers used to encapsulate data packets carried by the links.

18. A service management method comprising:
    at a modeling platform, creating a plurality of connection group objects representing physical links and logical links that connect a set of nodes of a communications network;
    at a distinct provisioning platform, using the plurality of connection group objects created by the modeling platform, establishing a communications service between an originating node of the network and a terminating node of the network by:
        associating one or more first objects with the service, the one or more first objects representing logical links joining nodes of the network;
        associating one or more second objects with the first objects, the second objects representing physical links joining endpoints of the logical links; and
        allocating resources of the first objects and the second objects to the service; and
    at the provisioning platform, responsive to a request to terminate the service, deallocating at least some of the resources without disrupting the association between the service and the first and second objects;
    wherein the modeling platform supersets and normalizes the links in creating the connection group objects such that the subsequent use of a recursive algorithm by the provisioning platform is enabled.

19. The method of claim 18 further comprising responsive to a request to reinstate the service, allocating resources of the first objects and the second objects to the service.

20. The method of claim 18 wherein the deallocating comprises deallocating without disrupting the association between the first objects and the second objects.

* * * * *